(12) United States Patent  
Koike et al.

(10) Patent No.: US 8,032,257 B2  
(45) Date of Patent: Oct. 4, 2011

(54) FIELD EQUIPMENT OF TWO-WIRE

(75) Inventors: Yasumi Koike, Musashino (JP); Ikuhiko Ishikawa, Musashino (JP); Toru Shimura, Musashino (JP)

(73) Assignee: Yokogawa Electric Corporation, Tokyo (JP)

( * ) Notice: Subject to any disclaimer, the term of this patent is extended or adjusted under 35 U.S.C. 154(b) by 540 days.

(21) Appl. No.: 12/145,773

(22) Filed: Jun. 25, 2008

(65) Prior Publication Data

US 2009/0024254 A1    Jan. 22, 2009

(30) Foreign Application Priority Data

Jun. 25, 2007   (JP) ................................. 2007-165733

(51) Int. Cl.
    *G01F 1/00*    (2006.01)
    *G05D 7/00*    (2006.01)
    *G06F 1/32*    (2006.01)
(52) U.S. Cl. .......................................... 700/282; 702/45
(58) Field of Classification Search .................... 700/11, 700/282, 295; 702/45, 50, 55, 65
    See application file for complete search history.

(56) References Cited

U.S. PATENT DOCUMENTS

| 6,438,462 | B1 * | 8/2002 | Hanf et al. | 700/297 |
| 7,200,503 | B2 * | 4/2007 | Lalla | 702/65 |
| 7,630,844 | B2 * | 12/2009 | Lalla | 702/65 |
| 7,778,784 | B2 * | 8/2010 | Lalla | 702/65 |

FOREIGN PATENT DOCUMENTS

JP    2002-340638    11/2002

* cited by examiner

*Primary Examiner* — Charles Kasenge  
(74) *Attorney, Agent, or Firm* — Sughrue Mion, PLLC

(57) ABSTRACT

A field equipment includes: a signal processing section; a first calculation control section for generating a first control signal which controls a start of a signal processing of the signal processing section; first and second insulating sections coupled to the first calculation control section; and a second calculation control section coupled to the first and second insulating sections and the signal processing section, the second calculation control section receiving the first control signal and then transmitting a second control signal corresponding to the first control signal to the signal processing section. The signal processing section generates a processed signal based on the second control signal. The second calculation control section receives the processed signal, then transmits data related to the first signal to the first calculation control section via the second insulating section, and then shifts to a low power consumption mode.

7 Claims, 6 Drawing Sheets

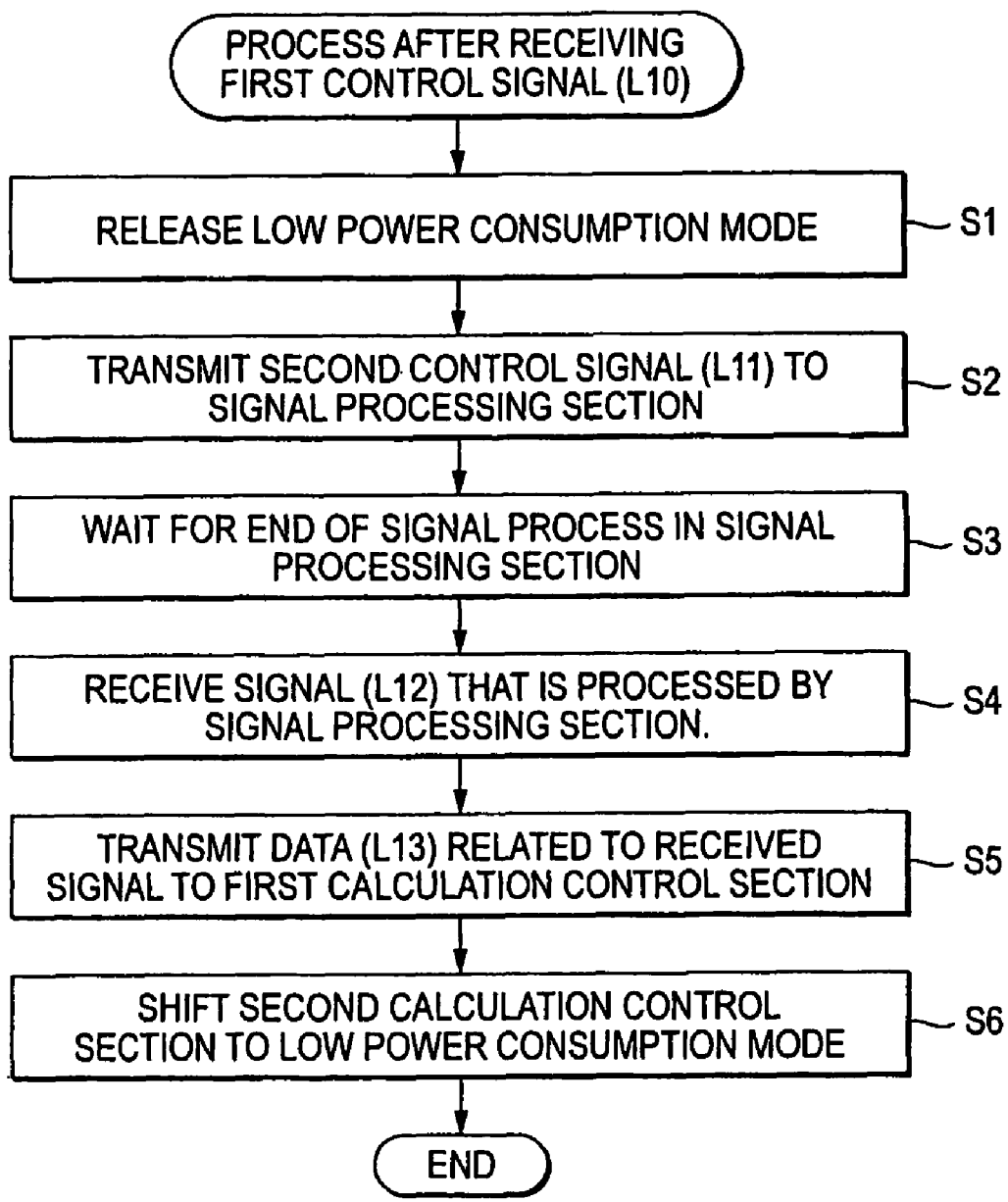

FIELD EQUIPMENT OF TWO-WIRE

This application is based on and claims priority from Japanese Patent Application No. 2007-165733, filed on Jun. 25, 2007, the entire contents of which are hereby incorporated by reference.

BACKGROUND

1. Technical Field

The present disclosure relates to a field equipment of two-wire and, more particularly, to a field equipment of two-wire capable of achieving a size reduction, a low cost, and low power consumption.

2. Background Art

The field equipment of two-wire constitutes a part of the plant facilities for use in process control, and measures a flow rate, a pressure, a temperature as a process quantity (measured object) and outputs this process quantity to a controller. Then, the controller executes the process control such as control of the flow rate, the pressure, the temperature, or the like. The field equipment of two-wire is supplied with an electric power from an external power source. Then, an electromagnetic flowmeter 18 of two-wire system as one of the field equipment will be described with reference to FIG. 6 hereunder.

The electromagnetic flowmeter 18 is constructed by a detecting section 4 for detecting a signal related to process quantity, a signal processing section 7, insulating sections 8 to 12, a calculation control section 13, a DC-DC converter 14, an exciting section 15, a current output section 16, etc.

The electromagnetic flowmeter 18 applies a magnetic field to a measured fluid that flows through a pipe of the detecting section 4, then detects an electric signal generated in the measured fluid based on the magnetic field, and then calculates a flow rate of the measured fluid based on the electric signal to output the flow rate.

One output terminal T1 of a pair of output terminals of the electromagnetic flowmeter 18 is coupled to a positive terminal (+) of an external DC power supply 20, and the other output terminal T2 is coupled to a negative terminal (−) of the external DC power supply 20 via a resistor 19.

The electromagnetic flowmeter 18 takes in a current corresponding to a flow rate value to be calculated (e.g., in a range from 4 mA to 20 mA) from the positive terminal (+) of the DC power supply 20 to said one output terminal T1, and outputs the current from the other output terminal T2 to the negative terminal (−) of the DC power supply 20 via the resistor 19. Accordingly, the electromagnetic flowmeter 18 is supplied with the electric power given by the DC voltage and the current of the DC power supply 20.

A controller 21 is coupled across the resistor 19 and measures the current being output from the electromagnetic flowmeter 18 as the voltage across the resistor 19, and then converts this measured voltage to a flow rate value, and thus executes flow rate control.

Said one output terminal T1 coupled to the positive terminal (+) of the DC power supply 20 is coupled to a first power supply line L1. The power supply terminals of the calculation control section 13, the input side (SW control circuit) of the DC-DC converter 14, the exciting section 15, the current output section 16, and the insulating sections 8 to 12 are coupled to the first power supply line L1.

A connection point of the current output section 16 and the output current detection resistor 17 is coupled to a first common potential L2. The reference potential terminals of the calculation control section 13, the input side (SW control circuit) of the DC-DC converter 14, the exciting section 15, the current output section 16, and the insulating sections 8 to 12 are coupled to the first common potential L2. Then, the calculation control section 13, the DC-DC converter 14, the exciting section 15, the current output section 16, and the insulating sections 8 to 12 are supplied with an electric power from the first power supply line L1.

A power supply terminal on the output side of the DC-DC converter 14 is coupled to a second power supply line L3. The power supply terminals of an amplifier 5, an AD converter 6, and the insulating sections 8 to 12 are coupled to the second power supply line L3.

A reference potential terminal on the output side of the DC-DC converter 14 is coupled to a second common potential L4. The reference potential terminals of the amplifier 5, the AD converter 6, and the insulating sections 8 to 12 are coupled to the second common potential L4. Then, the amplifier 5, the AD converter 6, and the insulating sections 8 to 12 are supplied with an electric power from the output (the second power supply line L3) of the DC-DC converter 14.

The detecting section 4 is constructed by an exciting coil 1, electrodes 2 and 3, a pipe (not shown) that flows through the measured fluid, and the like. Also, the exciting section 15 is coupled to the calculation control section 13 and the exciting coil 1, and feeds an excitation current to the exciting coil 1 based on a control signal L8 from the calculation control section 13.

The exciting coil 1 generates a magnetic field in the pipe of the detecting section 4 and applies the magnetic field to the measured fluid in the pipe. Thus, an electric signal (an induced voltage) that is proportional to a magnetic flux density of the magnetic field and a flow rate of the measured fluid is generated in the measured fluid flowing through the pipe. Then, this electric signal is detected by the electrodes 2 and 3 arranged in the pipe.

The signal processing section 7 is constructed by the amplifier 5 and the AD converter 6. The amplifier 5 is constructed by a differential amplifier, a noise removal filter, an empty sensing section (not shown) for sensing whether or not the measured fluid is present in the pipe.

The differential amplifier of the amplifier 5 receives signals L6, L7 related to process quantity and detected by the electrodes 2, 3, and outputs a signal being obtained by amplifying differentially the signals to the AD converter 6. This differentially amplified signal is in proportion to a flow rate of the measured fluid.

The AD converter 6 receives the control signal output from the calculation control section 13 via the insulating section 8, and performs AD-conversion (Analog-Digital signal conversion) on the differentially amplified signal based on this control signal. The AD converter 6 outputs the AD-converted signal to the calculation control section 13 via the insulating section 9 after the AD conversion is completed.

Also, when the output of the differential amplifier of the amplifier 5 is saturated, the amplifier 5 receives the control signal output from the calculation control section 13 via the insulating section 10, and changes (reduces) an amplification factor of the differential amplifier based on this control signal.

Also, the amplifier 5 receives the control signal output from the calculation control section 13 via the insulating section 11, and causes the noise removal filter consisting of a resistor and a capacitor to discharge a charge accumulated in the capacitor based on the control signal. Also, the amplifier 5 receives the control signal output from the calculation control section 13 via the insulating section 12, and causes the empty sensing section to perform an empty sensing function based on the control signal.

The insulating sections 8 to 12 have an interface function of electrically insulating the circuits whose reference potentials are different (the first reference potential L2 and the second reference potential L4) mutually and converting the signals such that these circuits can transmit/receive the signal mutually.

Here, the electrodes 2 and 3 might be grounded via the measured fluid having an electric conductivity in the pipe and the piping (not shown) coupled to the detecting section 4. Also, the negative terminal (−) of the DC power supply 20 might be grounded.

Unless the insulating sections 8 to 12 are provided, a loop current flows through the electromagnetic flowmeter 18, the measured fluid, the piping, and the DC power supply 20 when the electrodes 2 and 3 and the negative terminal (−) of the DC power supply 20 are grounded. Then, a common mode voltage is generated by this loop current, and an error arises in the output of the electromagnetic flowmeter 18. The insulating sections 8 to 12 are provided to prevent this loop current.

The DC-DC converter 14 might be an insulation-type DC voltage converting circuit of the inverter system. The DC-DC converter 14 converts the DC voltage on the first power supply line L1 into the AC voltage by the SW control circuit, then upconverts or downconverts the AC voltage by a transformer, and then rectifies the resultant AC voltage by a diode and a capacitor. Thus, the DC voltage on the first power supply line L1 is converted into the DC voltage on the second power supply line L3.

A circuit group coupled to the first power supply line L1 and the first common potential L2 and a circuit group coupled to the second power supply line L3 and the second common potential L4 are electrically insulated mutually by the DC-DC converter 14.

The calculation control section 13 calculates a flow rate value of the measured fluid by multiplying the AD-converted signal by an inner diameter of the pipe of the detecting section 4.

The calculation control section 13 outputs a PWM signal (pulse-width modulated signal) L9 with a duty factor, which is in proportion to a calculated value of the flow rate, to the current output section 16.

An output current detection resistor 17 detects an output current to the resistor 19 as a voltage L5. The current output section 16 outputs a current, which is in proportion to a calculated value of the flow rate, by comparing the voltage that is obtained by smoothing the PWM signal L9 with the voltage L5 (see e.g., JP-A-2002-340638).

Often a large number of the field equipments of two-wire such as the electromagnetic flowmeter 18 of two-wire system are installed in the field site where the pipe through which the measured fluid flows are provided. Therefore, it is preferable that such a field equipment of two-wire should be small in size including an installing space and low in cost. Also, it is demanded in some cases that the field equipment of two-wire has a low power consumption (e.g., a current consumption of the equipment is 3.8 mA or less) to satisfy the intrinsically safe explosion-proof standards such as IEC60079-11.

However, as described in FIG. 6, the field equipment of two-wire needs many insulating sections. This insulating section is constructed by a transformer, a photocoupler that needs an emitting signal driving transistor and a receiving light signal detecting transistor, or the like. In this manner, because the number of circuit components is increased in the insulating section, it is difficult to manufacture the field equipment of two-wire in a small size, at a low cost, and at low power consumption.

SUMMARY

Exemplary embodiments of the present invention address the above disadvantages and other disadvantages not described above. However, the present invention is not required to overcome the disadvantages described above, and thus, an exemplary embodiment of the present invention may not overcome any of the problems described above.

It is an aspect of the present invention to provide a field equipment of two-wire capable of achieving a size reduction, a low cost, and a low power consumption.

According to one or more aspects of exemplary embodiments of the present invention) in a field equipment of two-wire system that calculates a process quantity based on a signal related to the process quantity, the field equipment comprises: a signal processing section for processing the signal related to the process quantity; a first calculation control section for generating a first control signal which controls a start of a signal processing of the signal processing section; first and second insulating sections coupled to the first calculation control section; and a second calculation control section coupled to the first and second insulating sections and the signal processing section, the second calculation control section receiving the first control signal and then transmitting a second control signal corresponding to the first control signal to the signal processing section. The signal processing section generates a processed signal based on the second control signal, and the second calculation control section receives the processed signal, then transmits data related to the processed signal to the first calculation control section via the second insulating section, and then shifts to a low power consumption mode.

According to one or more aspects of exemplary embodiments of the present invention, the signal processing section comprises an AD converter for performing an AD-conversion on the signal related to the process quantity, and wherein the second calculation control section transmits the second control signal to the AD converter, and the AD converter generates an AD-converted signal based on the second control signal, and the second calculation control section receives the AD-converted signal, then transmits data related to the AD-converted signal to the first calculation control section via the second insulating section, and then shifts to the low power consumption mode.

According to one or more aspects of exemplary embodiments of the present invention, the field equipment is an electromagnetic flowmeter of two-wire system.

According to one or more aspects of exemplary embodiments of the present invention, the second calculation control section is operable to: in the following order, i) transmit the second control signal to the AD converter; ii) shift to the low power consumption mode; iii) receive the AD-converted signal; iv) release the low power consumption mode; v) transmit the data related to the AD-converted signal to the first calculation control section via the second insulating section; vi) shift to the low power consumption mode.

According to one or more aspects of exemplary embodiments of the present invention, the field equipment is any one of a pressure transmitter, a temperature transmitter, a vortex flowmeter and a level gauge.

According to one or more aspects of exemplary embodiments of the present invention, the field equipment further comprises: a DC-DC converter coupled to the first and second insulating sections and the second calculation control section, wherein the signal processing section further comprises an amplifier for amplifying the signal related to the process quantity and coupled to the AD converter.

According to the exemplary embodiments, the number of circuit parts can be reduced in the field equipment of two-wire by reducing the insulating sections in number, and the calculation control section of the field equipment is brought temporarily into a low power consumption mode. Therefore, there is provided the field equipment of capable of achieving a size reduction, a low cost, and a low power consumption.

Other aspects and advantages of the invention will be apparent from the following description, the drawings and the claims.

BRIEF DESCRIPTION OF THE DRAWINGS

The above and other aspects, features and advantages of the present invention will be more apparent from the following more particular description thereof, presented in conjunction with the following drawings wherein:

FIG. 3 is a flowchart of operations of a second calculation control section after a first control signal is received;

DETAILED DESCRIPTION

Exemplary embodiments of the present invention will be described with reference to the accompanying drawings.

First Embodiment

Figure 1:
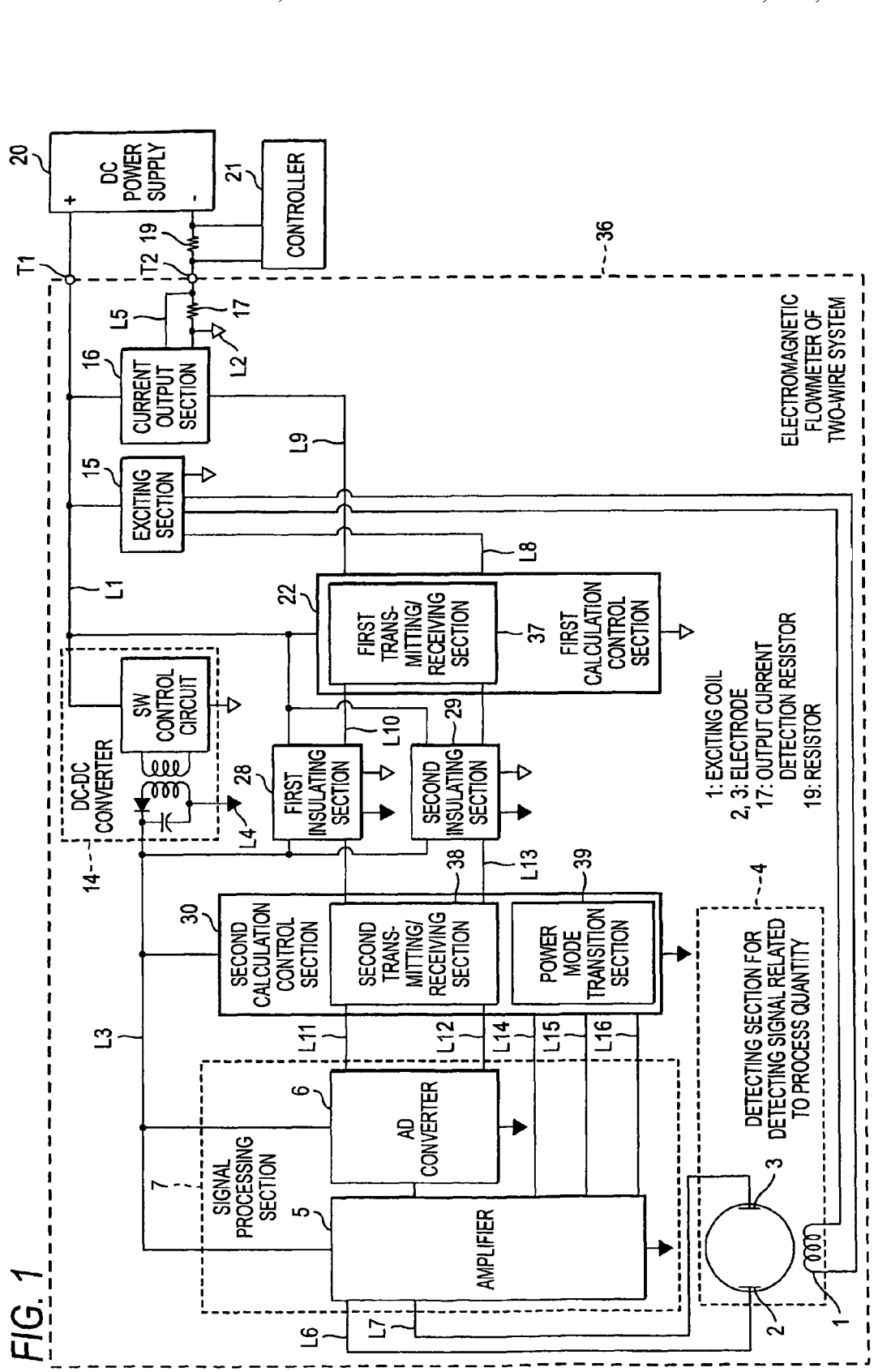
FIG. 1 is a block diagram illustrating an electromagnetic flowmeter of two-wire system according to one exemplary embodiment of the present invention.

A first embodiment will be described with reference to FIG. 1 hereunder. FIG. 1 is a block diagram illustrating an electromagnetic flowmeter of two-wire system according to the exemplary embodiment of the present invention, and explanation of the same portions as those in FIG. 6 will be omitted herein by affixing the same reference symbols to them. In the present embodiment, the number of the insulating sections is reduced and also the calculation control section is brought about temporarily into a low power consumption mode.

An electromagnetic flowmeter of two-wire system 36 is constructed by the detecting section for detecting signal related to process quantity 4, the signal processing section 7, the DC-DC converter 14, the exciting section 15, the current output section 16, a first calculation control section 22, a first insulating section 28, a second insulating section 29, a second calculation control section 30, and the like.

The electromagnetic flowmeter 36 of two-wire system applies a magnetic field to a measured fluid that flows through the pipe of the detecting section 4 for detecting signal related to process quantity, then detects an electric signal generated in the measured fluid by the magnetic field, and then calculates a flow rate of the measured fluid based on this electric signal to output the flow rate.

One output terminal T1 of a pair of output terminals of the electromagnetic flowmeter 36 is coupled to the positive terminal (+) of the external DC power supply 20, and the other output terminal T2 is coupled to the negative terminal (−) of the external DC power supply 20 via the resistor 19.

The electromagnetic flowmeter 36 takes in a current corresponding to a flow rate value to be calculated (e.g., in a range from 4 mA to 20 mA) from the positive terminal (+) of the DC power supply 20 to one output terminal T1, and outputs the current from the other output terminal T2 to the negative terminal (−) of the DC power supply 20 via the resistor 19. Accordingly, the electromagnetic flowmeter 36 is supplied with the electric power given by the DC voltage and the current of the DC power supply 20.

The controller 21 is coupled across the resistor 19 and measures the current being output from the electromagnetic flowmeter 36 as the voltage across the resistor 19, and then converts the measured voltage to a flow rate value, and thus executes flow rate control.

One output terminal T1 coupled to the positive terminal (+) of the DC power supply 20 is coupled to the first power supply line L1. The power supply terminals of the first calculation control section 22, the input side (SW control circuit) of the DC-DC converter 14, the exciting section 15, the current output section 16, the first insulating section 28, and the second insulating section 29 are coupled to the first power supply line L1.

A connection point of the current output section 16 and the output current detection resistor 17 is coupled to the first common potential L2. The reference potential terminals of the first calculation control section 22, the input side (SW control circuit) of the DC-DC converter 14, the exciting section 15, the current output section 16, the first insulating section 28, and the second insulating section 29 are coupled to the first common potential L2.

Then, the first calculation control section 22, the DC-DC converter 14, the exciting section 15, the current output section 16, the first insulating section 28, and the second insulating section 29 are supplied with an electric power from the first power supply line L1.

The power supply terminal on the output side of the DC-DC converter 14 is coupled to the second power supply line L3. The power supply terminals of the amplifier 5, the AD converter 6, the second calculation control section 30, the first insulating section 28, and the second insulating section 29 are coupled to the second power supply line L3.

The reference potential terminal on the output side of the DC-DC converter 14 is coupled to the second common potential L4. The reference potential terminals of the amplifier 5, the AD converter 6, the second calculation control section 30, the first insulating section 28, and the second insulating section 29 are coupled to the second common potential L4.

Then, the amplifier 5, the AD converter 6, the second calculation control section 30, the first insulating section 28, and the second insulating section 29 are supplied with an electric power from the output (the second power supply line L3) of the DC-DC converter 14.

The detecting section 4 is constructed by the exciting coil 1, the electrodes 2 and 3, the pipe (not shown) that flows through the measured fluid, and the like. Also, the exciting section 15 is coupled to the first calculation control section 22 and the exciting coil 1, and feeds the excitation current to the exciting coil 1 based on the control signal L8 from the first calculation control section 22.

The exciting section 15 is disclosed in FIG. 2 of JP-A-2002-340638, for example, and the direction of the excitation current is controlled by a signal pattern shown in FIG. 3.

When the excitation current is applied to the exciting coil 1, the exciting coil 1 generates the magnetic field in the pipe of the detecting section 4, and applies the magnetic field to the measured fluid in the pipe. Thus, an electric signal (an induced voltage) that is proportional to a magnetic flux density of this magnetic field and a flow rate of the measured fluid is generated in the measured fluid flowing through the pipe. Then, this electric signal is detected by the electrodes 2 and 3 arranged in the pipe, and the electrodes 2 and 3 output the signal L6 and L7 related to process quantities.

The signal processing section 7 is constructed by the amplifier 5, the AD converter 6, etc. The amplifier 5 is constructed by a differential amplifier, a noise removal filter, an empty sensing section (not shown) for sensing whether or not measured fluid is present in the pipe.

The differential amplifier of the amplifier 5 receives the signals L6 and L7 detected by the electrodes 2 and 3, and outputs the signal being obtained by amplifying differentially these signals to the AD converter 6. This differentially amplified signal is in proportion to a flow rate of the measured fluid.

The AD converter 6 performs AD-conversion (analog-digital signal conversion) on the differentially amplified signal received from the amplifier 5. The signal processing containing this AD-converting operation will be described with reference to FIGS. 2A to 2C and FIG. 3 hereunder.

Figure 2A:
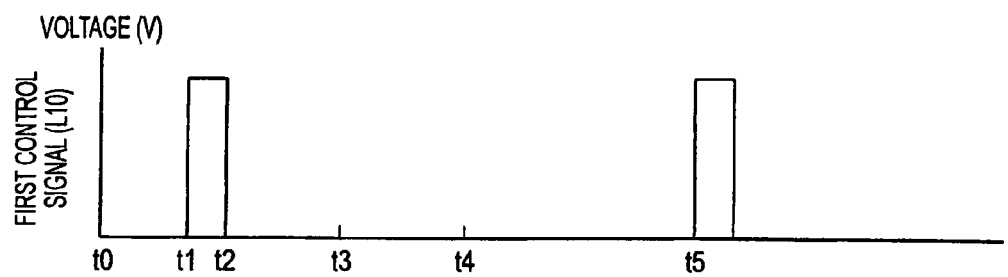
FIGS. 2A to 2C are timing charts of respective signals in FIG. 1.
Figure 2B:
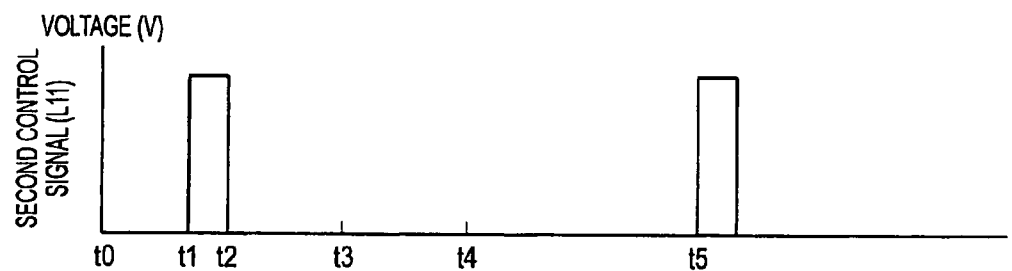
Figure 2C:
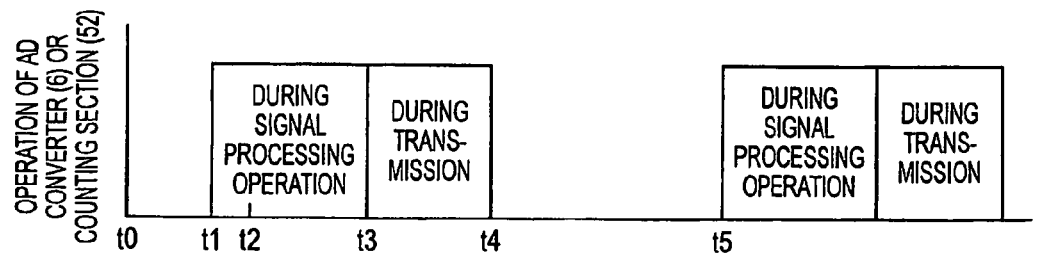

FIGS. 2A to 2C are timing charts of respective signals in FIG. 1. FIG. 2A shows a first control signal L10. FIG. 2B shows a second control signal L11. FIG. 2C is a timing chart of operations of the AD converter 6 in the signal processing section 7. FIG. 3 is a flowchart of operations of the second calculation control section 30 after the first control signal L10 is received.

The first calculation control section 22 is constructed by a first transmitting/receiving section 37. The second calculation control section 30 is constructed by a second transmitting/receiving section 38 and a power mode transition section 39.

The second calculation control section 30 has a normal power consumption mode and a low power consumption mode as its power consumption modes. The power mode transition section 39 can transfer from one mode to the other mode.

The "normal power consumption mode" is a mode where internal circuits, which are provided to the second calculation control section 30 to execute calculation, operate in synchronism with the clock fed from an internal clock (not shown).

The "low power consumption mode" is a mode where the internal circuits are suspended when a supply of the clock from the internal clock is stopped. Naturally, a power consumption of the second calculation control section 30 in the low power consumption mode is smaller than that in the normal power consumption mode. Normally, the low power consumption mode is called a sleep mode, a standby mode, a low power mode, or the like.

The second calculation control section 30 executes a predetermined process such as an initializing process when a voltage is applied, and then shifts to the low power consumption mode.

The first control signal L10 being output from the first transmitting/receiving section 37 is transmitted to the second transmitting/receiving section 38 via the first insulating section 28. The first control signal L10 goes from a low level voltage (e.g., 0V) to a high level voltage (e.g., a voltage on the first power supply line L1) at a time t1 in FIG. 2A, and goes back to the low level voltage at a time t2. The first control signal L10 is used to control a start of the signal processing (acting as a start point).

The second transmitting/receiving section 38 senses a change of the voltage (rising edge) on the first control signal L10 at a time t1, and the second calculation control section 30 executes the operation in FIG. 3 base on this sensing. In this case, this change may be sensed by an interrupt signal, a chip select signal, or the like.

In FIG. 3, the power mode transition section 39 release the low power consumption mode of the second calculation control section 30, and shifts the second calculation control section 30 to the normal power consumption mode (step S1).

Then, the second transmitting/receiving section 38 transmits the second control signal L11 to the AD converter 6 (step S2). The second control signal L11 goes from a low level voltage to a high level voltage after a time t1 in FIG. 2B, and goes back to the low level voltage after a time t2.

Then, the AD converter 6 performs the AD conversion process operation for a period from a time t1 to a time t3 in FIG. 2C, based on the second control signal L11 received from the second transmitting/receiving section 38. The second calculation control section 30 stands by until the AD conversion process operation is ended (step S3).

After the AD conversion process operation is ended, the AD converter 6 transmits an AD-converted signal L12 to the second transmitting/receiving section 38 for a period from a time t3 to a time t4.

Then, the second transmitting/receiving section 38 receives the AD-converted signal L12 (step S4). Then, the second calculation control section 30 outputs the received signal data or data that is subject to a predetermined calculation (e.g., a predetermined value is added/subtracted to/from the received signal data) as data L13. Then, the data L13 is transmitted to the first calculation control section 37 via the second insulating section 29 (step S5).

Then, the power mode transition section 39 shifts the second calculation control section 30 to the low power consumption mode (step S6).

Then, the first transmitting/receiving section 37 outputs the first control signal L10 at a time t5 in FIG. 2A, and then the above operations in FIG. 3 (steps S1 to S6) are repeated in a predetermined period. In this case, for example, a time period from t1 to t5 is set to several hundred micro second (predetermined time period), and a time period from t1 to t4 is set to several tens micro second.

Also, the change of an amplification factor, the discharge of the filter, and the empty sensing shown hereunder are performed periodically or non-periodically.

When the output of the differential amplifier of the amplifier 5 is saturated, the amplifier 5 receives a control signal L14 from the second calculation control section 30, and changes (reduces) an amplification factor of the differential amplifier based on the control signal L14.

Also, the amplifier 5 receives a control signal L15 from the second calculation control section 30, and causes the noise removal filter consisting of a resistor and a capacitor to discharge a charge accumulated in the capacitor based on the control signal L15. Also, the amplifier 5 receives a control signal L16 from the second calculation control section 30, and causes the empty sensing section to perform an empty sensing function based on the control signal L16.

In this case, the first control signal L10 might contain a command signal for instructing output operations of respective control signals L11, L14, L15, and L16.

Figure 6:
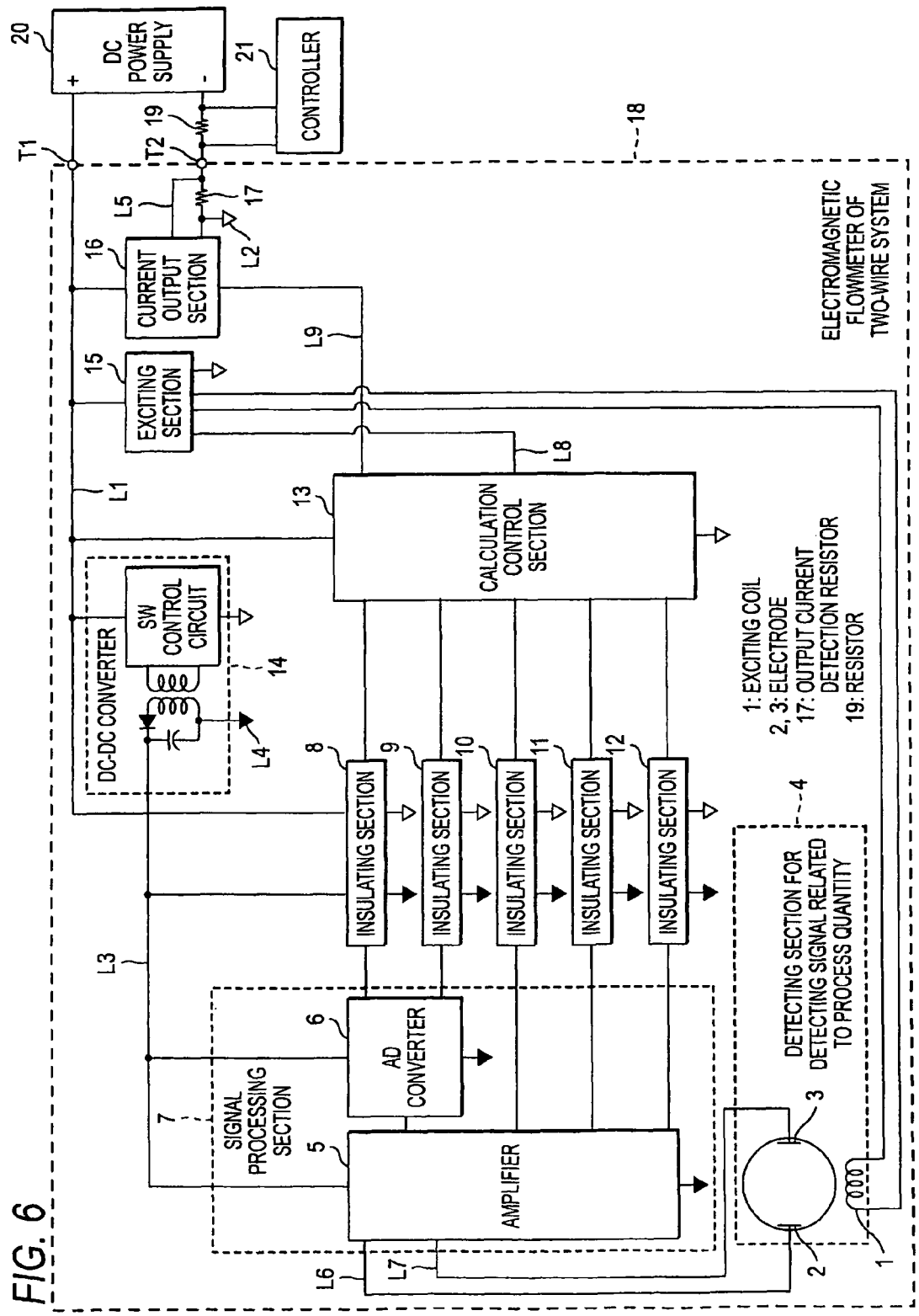
FIG. 6 is a block diagram illustrating an electromagnetic flowmeter of two-wire system in the related art.

Then, owing to the foregoing operations of the first calculation control section 22 and the second calculation control section 30 in FIGS. 2A to 2C and FIG. 3, the number of insulating sections can be reduced as compared with FIG. 6.

The first insulating section 28 and the second insulating section 29 have an interface function of electrically insulating the circuits whose reference potentials are different (the first reference potential L2 and the second reference potential L4)

mutually and converting the signals such that these circuits can transmit/receive the signal mutually. The first insulating section 28 and the second insulating section 29 might be constructed by a transformer that is magnetically coupled and a photocoupler that is optically coupled.

Here, the electrodes 2 and 3 might be grounded via the measured fluid having an electric conductivity in the pipe and the pipe (not shown) coupled to the detecting section 4. Also, the negative terminal (−) of the DC power supply 20 might be grounded.

Unless the first insulating section 28 and the second insulating section 29 are provided, a loop current flows through the electromagnetic flowmeter 36, the measured fluid, the piping, and the DC power supply 20 when the electrodes 2 and 3 and the negative terminal (−) of the DC power supply 20 are grounded. Then, a common mode voltage is generated by this loop current, and an error is caused in the output of the electromagnetic flowmeter 36. The first insulating section 28 and the second insulating section 29 are provided to prevent this loop current.

The DC-DC converter 14 might be an insulation-type DC voltage converting circuit of the inverter system. The DC-DC converter 14 converts the DC voltage on the first power supply line L1 into the AC voltage by the SW control circuit, then upconverts or downconverts the AC voltage by a transformer, and then rectifies the resultant AC voltage by a diode and a capacitor. Thus, the DC voltage on the first power supply line L1 is converted into the DC voltage on the second power supply line L3.

A circuit group coupled to the first power supply line L1 and the first common potential L2 and a circuit group coupled to the second power supply line L3 and the second common potential L4 are electrically insulated mutually by the DC-DC converter 14.

The first calculation control section 22 calculates a flow rate value of the measured fluid by multiplying the received data L13 by an inner diameter of the pipe of the detecting section 4.

The first calculation control section 22 outputs the PWM signal (pulse-width modulated signal) L9 with a duty factor, which is in proportion to a calculated value of the flow rate, to the current output section 16.

The output current detection resistor 17 detects an output current to the resistor 19 as a voltage L5. The current output section 16 outputs a current which is in proportion to a calculated value of the flow rate, by comparing the voltage that is obtained by smoothing the PWM signal L9 with the voltage L5. The current output section 16 is disclosed in FIG. 4 of JP-A-2002-340638, for example.

In this case, the current output section 16 may communicate the calculated flow rate value, the parameter data, etc. to the controller 21 by superposing a communication signal (not shown) received from the first calculation control section 22 on the output current. As this communication protocol, field bus communication as well as hart communication may be employed. Also, the electromagnetic flowmeter 36 may have a display section (not shown) for displaying the calculated flow rate value, and the like.

According to the present embodiment, the number of circuit parts can be reduced in the field equipment of two-wire by reducing the insulating sections in number, and the calculation control sections shifts temporarily to a low power consumption mode. Therefore, there is provided the field equipment of two-wire capable of achieving a size reduction, a low cost, and low power consumption.

Second Embodiment

Figure 4:
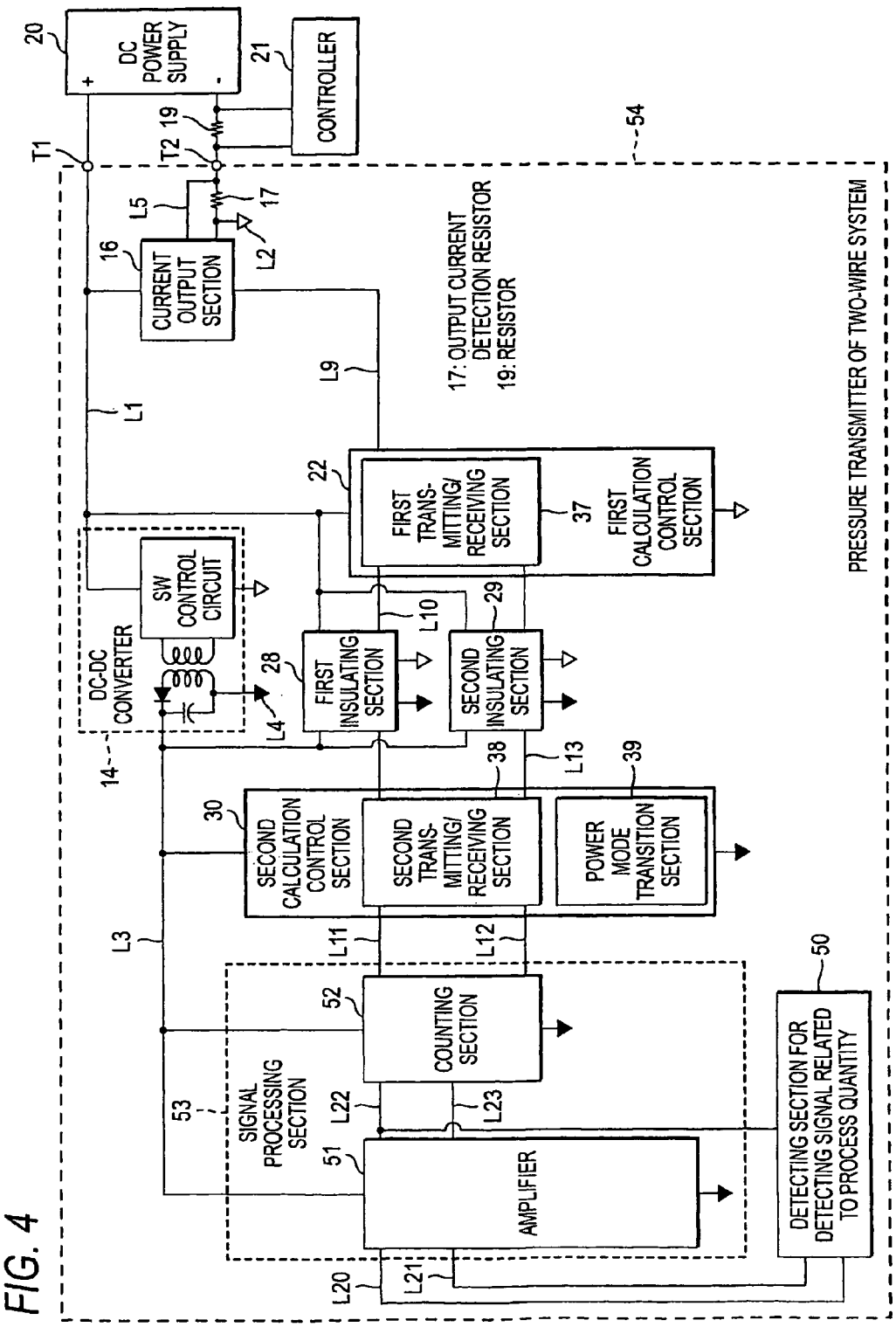
FIG. 4 is a block diagram illustrating a pressure transmitter of two-wire system according to another exemplary embodiment of the present invention.

A second embodiment will be described with reference to FIG. 4 hereunder. FIG. 4 is a block diagram illustrating a pressure transmitter of two-wire system according to the exemplary embodiments of the present invention, and explanation of the same portions as those in FIG. 1 will be omitted herein by affixing the same reference symbols to them. A pressure transmitter of two-wire system performs similar operations to those in FIGS. 2A to 2C and 3. Only different portions from the first embodiment will be described hereunder.

A pressure transmitter of two-wire system 54 detects a pressure applied to a detecting section 50 for detecting signal related to process quantity as an electric signal, and calculates a measured pressure based on this electric signal and then outputs it. Also, the pressure transmitter 54 of two-wire system can calculate a flow rat of the measured fluid based on a pressure difference between the upstream side and the downstream side of an orifice (not shown) provided in the pipe through which the measured fluid flows, and then outputs it.

The detecting section 50 is constructed by a diaphragm for accepting a pressure, a vibration sensor (not shown) whose vibration frequency is varied by a pressure, or the like. The detecting section 50 outputs an electric signal whose frequency corresponds to a pressure difference between the upstream side and the downstream side, as signals L20 and L21 related to process quantity.

A signal processing section 53 is constructed by an amplifier 51, a counting section 52, and the like. The amplifier 51 receives the signals L20, L21, and then outputs amplified signals L22, L23 to the counting section 52. The signal L22 is output to the detecting section 50 to drive the vibration sensor. The signal processing containing this counting operation will be described with reference to FIGS. 2A to 2C and 3 hereunder.

The first transmitting/receiving section 37 outputs the first control signal L10, and the second calculation control section 30 receives this signal L10 and executes operations in steps S1 and S2 in FIG. 3. Then, the counting section 52 counts a frequency of the signals L22 and L23 in a time period from a time t1 to a time t3 in FIG. 2C, based on the second control signal L11 received from the second transmitting/receiving section 38. The second calculation control section 30 stands by until the counting processing operation is ended (step S3).

After the counting processing operation is ended, the counting section 52 transmits a count signal L12 to the second transmitting/receiving section 38 in a time period from a time t3 to a time t4 in FIG. 2C.

The second transmitting/receiving section 38 receives the count signal L12 (step S4). Then, the second calculation control section 30 outputs this received signal data or the data that is subject to a predetermined calculation (e.g., a predetermined value is added/subtracted to/from the received signal data) as the data L13. Then, the data L13 is transmitted to the first transmitting/receiving section 37 via the second insulating section 29 (step S5).

Then, the power mode transition section 39 shifts the second calculation control section 30 to the low power consumption mode (step S6).

Then, the first transmitting/receiving section 37 outputs the first control signal L10 at a time t5 in FIG. 2A, and then the foregoing operations (steps S1 to S6) in FIG. 3 are repeated in a predetermined period.

The first calculation control section 22 calculates a measured pressure value by applying a predetermined operation to the received data L13. The first calculation control section 22 outputs the PWM signal (pulse-width modulated signal) L9 with a duty factor, which is in proportion to a calculated value of the pressure, to the current output section 16. Then, the current output section 16 outputs an electric current that is proportional to the measured pressure value.

In addition to the electromagnetic flowmeter and the pressure transmitter explained above, a temperature transmitter, a vortex flowmeter, a level gauge, and the like might be used as the field equipment of two-wire.

According to the present embodiment, the field equipment of two-wire similar to that in the first embodiment can be implemented.

Third Embodiment

Figure 5:
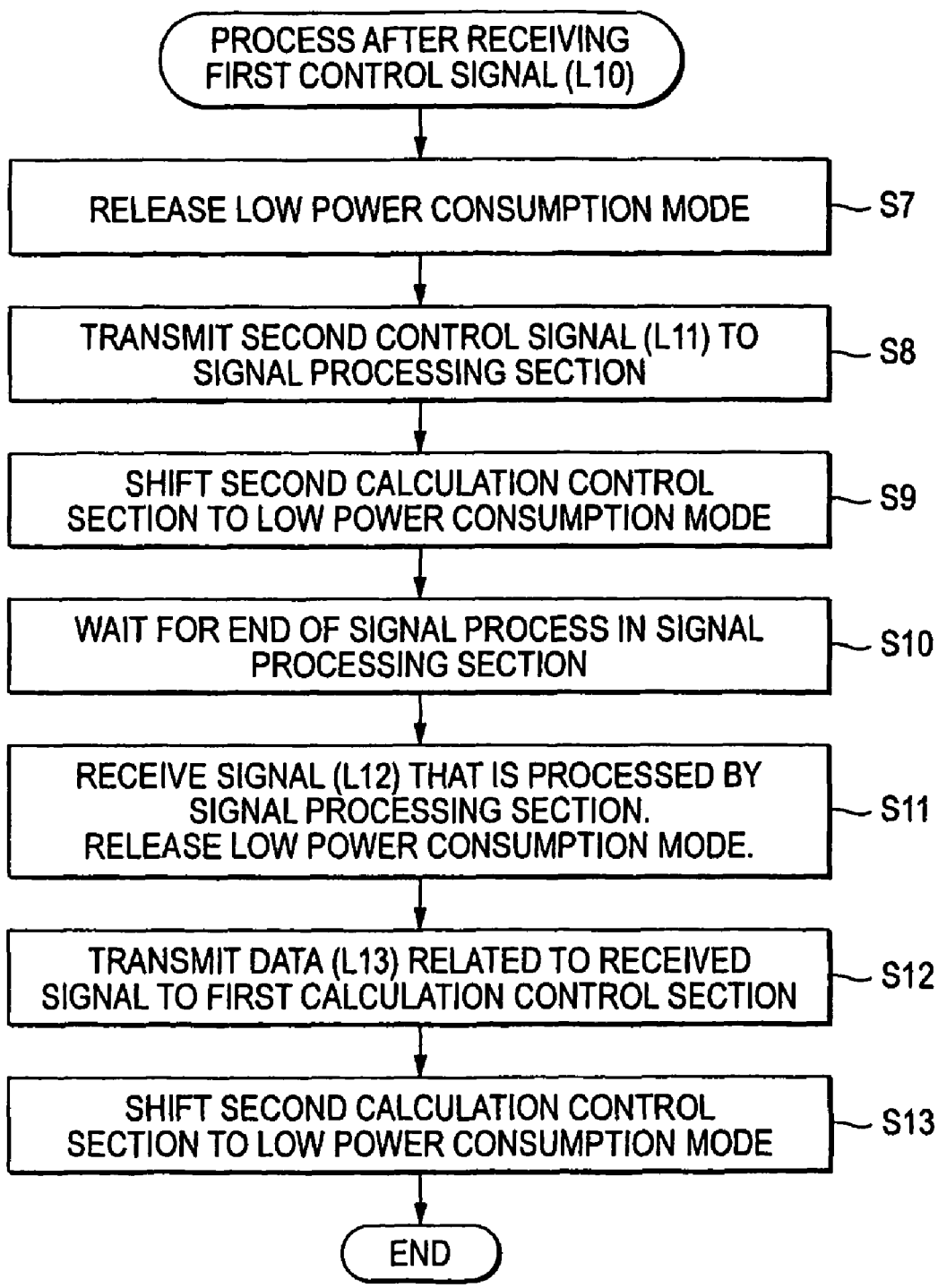
FIG. 5 is another flowchart of operations of the second calculation control section after the first control signal is received.

A third embodiment will be described with reference to FIG. 1, FIGS. 2A to 2C, and FIG. 5 hereunder. Respective portions of electromagnetic flowmeter of two-wire system different from the first embodiment will be described using mainly FIG. 5 hereunder. FIG. 5 is a flowchart of operations of the second calculation control section 30 after the first control signal L10 is received. In the present embodiment, operations for shifting the calculation control section to the low power consumption mode are changed from the first embodiment. Only the portions different from the first embodiment will be described hereunder.

The first control signal L10 output from the first transmitting/receiving section 37 is transmitted to the second transmitting/receiving section 38 via the first insulating section 28. The first control signal L10 goes from a low level voltage to a high level voltage at a time t1 in FIG. 2A, and goes back to a low level voltage at a time t2. The first control signal L10 is used to control a start of the signal processing (acting as a start point).

The second transmitting/receiving section 38 senses a change of the voltage (rising edge) on the first control signal L10 at a time t1, and the second calculation control section 30 executes the operation in FIG. 5 base on the sensing. In this case, this change may be sensed by an interrupt signal, a chip select signal, or the like.

The power mode transition section 39 releases the low power consumption mode of the second calculation control section 30, and shifts the second calculation control section 30 to the normal power consumption mode (step S7).

Then, the second transmitting/receiving section 38 transmits the second control signal L11 to the AD converter 6 (step S8). The second control signal L11 goes from a low level voltage to a high level voltage after a time t1 in FIG. 2B, and goes back to the low level voltage after a time t2.

After step S8, the power mode transition section 39 shifts the second calculation control section 30 to the low power consumption mode (step S9).

Then, the AD converter 6 performs the AD conversion process operation for a time period from a time t1 to a time t3 in FIG. 2C, based on the second control signal L11 received from the second transmitting/receiving section 38. The second calculation control section 30 stands by until the AD converting process operation is ended (step S10).

After the AD converting process operation is ended, the AD converter 6 transmits the AD-converted signal L12 to the second transmitting/receiving section 38 for a time period from a time t3 to a time t4.

The power mode transition section 39 releases the low power consumption mode of the second calculation control section 30 and brings the second calculation control section 30 into the normal power consumption mode at a point of time when the second transmitting/receiving section 38 receives the AD-converted signal L12. Then, the second transmitting/receiving section 38 completes the reception of the AD-converted signal L12 (step S11).

Then, the second calculation control section 30 outputs the received signal data or data that is subject to a predetermined calculation (e.g., a predetermined value is added/subtracted to/from the received signal data) as the data L13. Then, the data L13 is transmitted to the first calculation control section 37 via the second insulating section 29 (step S12).

Then, the power mode transition section 39 shifts the second calculation control section 30 to the low power consumption mode (step S13).

Then, the first transmitting/receiving section 37 outputs the first control signal L10 at a time t5 in FIG. 2A, and then the foregoing operations in FIG. 5 (steps S7 to S13) are repeated in a predetermined period.

According to the operations from steps S9 to S11 in FIG. 5, the second calculation control section 30 is shifted to the low power consumption mode while the AD conversion processing operation is carried out (in a time period from a time t1 to a time t3 in FIG. 2C) in addition to a time period of the low power consumption mode in the first embodiment.

According to the present embodiment, the field equipment of two-wire whose power consumption can be lowered as compared with the first embodiment.

The present invention is suitable for the field equipment of two-wire. More preferably, the present invention is more suitable for the electromagnetic flowmeter of two-wire system since the large current is fed to the exciting coil in the electromagnetic flowmeter of two-wire system and thus the power consumption is likely to increase While the present invention has been shown and described with reference to certain exemplary embodiments thereof, other implementations are within the scope of the claims. It will be understood by those skilled in the art that various changes in form and details may be made therein without departing from the spirit and scope of the invention as defined by the appended claims.

What is claimed is:

1. A field equipment of two-wire system that calculates a process quantity based on a signal related to the process quantity, the field equipment comprising:
   a signal processing section for processing the signal related to the process quantity;
   a first calculation control section for generating a first control signal which controls a start of a signal processing of the signal processing section;
   first and second insulating sections coupled to the first calculation control section; and
   a second calculation control section coupled to the first and second insulating sections and the signal processing section, the second calculation control section receiving the first control signal and then transmitting a second control signal corresponding to the first control signal to the signal processing section,
   wherein the signal processing section generates a processed signal based on the second control signal, and
   the second calculation control section receives the processed signal, then transmits data related to the processed signal to the first calculation control section via the second insulating section, and then shifts to a low power consumption mode.

2. The field equipment according to claim 1, wherein the signal processing section comprises an AD converter for performing an AD-conversion on the signal related to the process quantity, and
   wherein the second calculation control section transmits the second control signal to the AD converter, and the AD converter generates an AD-converted signal based on the second control signal, and the second calculation control section receives the AD-converted signal, then transmits data related to the AD-converted signal to the first calculation control section via the second insulating section, and then shifts to the low power consumption mode.

3. The filed equipment according to claim 1, wherein the field equipment is an electromagnetic flowmeter of two-wire system.

4. The filed equipment according to claim 1, wherein the field equipment is any one of a pressure transmitter, a temperature transmitter, a vortex flowmeter and a level gauge.

5. A field device comprising:
a signal processing section which performs signal processing on a signal related to a process quantity;
a first insulating section and a second insulating section;
a first calculation control section that is coupled to the signal processing section through the first insulating section, and controls a start of the signal processing of the signal processing section;
a second calculation control section that is coupled to the signal processing section and comprises a power mode transition section that switches the second calculation control section from a normal power mode to low power mode and vice versa, the second calculation control section receiving a first control signal from the first calculating control section, and in response, transmitting a second control signal corresponding to the first control signal to the signal processing section,
wherein the first and second insulating sections are provided in a signal path between the first calculating control section and the second calculating control section,
the signal processing section generates a processed signal based on the second control signal, and
the second calculation control section receives the processed signal, transmits data related to the processed signal to the first calculation control section through the second insulating section, and then the power mode transition section shifts the second calculation section to the low power consumption mode.

6. A field equipment of a two-wire system that calculates a process quantity based on a signal related to the process quantity, the field equipment comprising:
a signal processing section for processing the signal related to the process quantity;
a first calculation control section for generating a first control signal which controls a start of a signal processing of the signal processing section;
first and second insulating sections coupled to the first calculation control section;
a second calculation control section coupled to the first and second insulating sections and the signal processing section, the second calculation control section receiving the first control signal and then transmitting a second control signal corresponding to the first control signal to the signal processing section, and
a DC-DC converter coupled to the first and second insulating sections and the second calculation control section,
wherein the signal processing section generates a processed signal based on the second control signal,
the second calculation control section receives the processed signal, then transmits data related to the processed signal to the first calculation control section via the second insulating section, and then shifts to a low power consumption mode,
the signal processing section comprises an AD converter for performing an AD-conversion on the signal related to the process quantity, and
the second calculation control section transmits the second control signal to the AD converter, and the AD converter generates an AD-converted signal based on the second control signal, and the second calculation control section receives the AD-converted signal, then transmits data related to the AD-converted signal to the first calculation control section via the second insulating section, and then shifts to the low power consumption mode, and
the signal processing section further comprises an amplifier for amplifying the signal related to the process quantity and coupled to the AD converter.

7. A field equipment of a two-wire system that calculates a process quantity based on a signal related to the process quantity, the field equipment comprising:
a signal processing section for processing the signal related to the process quantity;
a first calculation control section for generating a first control signal which controls a start of a signal processing of the signal processing section;
first and second insulating sections coupled to the first calculation control section; and
a second calculation control section coupled to the first and second insulating sections and the signal processing section, the second calculation control section receiving the first control signal and then transmitting a second control signal corresponding to the first control signal to the signal processing section,
wherein the signal processing section generates a processed signal based on the second control signal,
the second calculation control section receives the processed signal, then transmits data related to the processed signal to the first calculation control section via the second insulating section, and then shifts to a low power consumption mode,
the signal processing section comprises an AD converter for performing an AD-conversion on the signal related to the process quantity,
the second calculation control section transmits the second control signal to the AD converter, and the AD converter generates an AD-converted signal based on the second control signal, and the second calculation control section receives the AD-converted signal, then transmits data related to the AD-converted signal to the first calculation control section via the second insulating section, and then shifts to the low power consumption mode, and
the second calculation control section is operable to: in the following order,
i) transmit the second control signal to the AD converter;
ii) shift to the low power consumption mode;
iii) receive the AD-converted signal;
iv) release the low power consumption mode;
v) transmit the data related to the AD-converted signal to the first calculation control section via the second insulating section;
vi) shift to the low power consumption mode.

* * * * *